United States Patent [19]

West et al.

[11] Patent Number: 5,766,694

[45] Date of Patent: Jun. 16, 1998

[54] METHOD FOR FORMING UNIFORMLY-SPACED PLASTIC SUBSTRATE LIQUID CRYSTAL DISPLAYS

[76] Inventors: John L. West, 164 N. Main St., Munore Falls, Ohio 44262; Philip J. Bos, 6808 Windsor Rd., Hudson, Ohio 44236

[21] Appl. No.: 864,498

[22] Filed: May 29, 1997

[51] Int. Cl.$^6$ .................................................. G02F 1/1339
[52] U.S. Cl. ........................ 427/510; 428/1; 349/156; 349/157; 349/92; 349/93; 349/187
[58] Field of Search ........................ 428/1; 427/510; 349/156, 157, 92, 93, 187

[56] References Cited

U.S. PATENT DOCUMENTS

| | | | |
|---|---|---|---|
| 3,863,332 | 2/1975 | Leupp et al. | |
| 4,295,712 | 10/1981 | Ishiwatari | 350/344 |
| 4,653,864 | 3/1987 | Baron et al. | 350/344 |
| 4,682,858 | 7/1987 | Kanbe et al. | 350/344 |
| 4,705,360 | 11/1987 | Funada et al. | 350/344 |
| 4,900,132 | 2/1990 | Bos | 350/346 |
| 4,973,138 | 11/1990 | Yamazaki et al. | 350/344 |
| 5,231,527 | 7/1993 | Takanashi et al. | 359/81 |
| 5,385,499 | 1/1995 | Ogawa et al. | 445/24 |
| 5,459,598 | 10/1995 | Carrington | 359/81 |
| 5,530,567 | 6/1996 | Takei | 359/51 |

FOREIGN PATENT DOCUMENTS

| | | |
|---|---|---|
| 61-173221 | 8/1986 | Japan. |
| 7072461 | 3/1995 | Japan. |
| 8320470 | 12/1996 | Japan. |

OTHER PUBLICATIONS

Late–News Poster: Axially Symmetric Aligned Microcell (ASM) Mode; Electro–Optical Characteristics of New Display Mode with Excellent Wide Viewing Angle, SID Digest, SID 95 Digest, pp. 575–578, 1995.

Primary Examiner—Erma Cameron
Attorney, Agent, or Firm—Renner, Kenner, Greive, Bobak, Taylor & Weber

[57] ABSTRACT

A method for forming a uniformly-spaced plastic substrate liquid crystal cell (100) includes the step of forming a cell with a liquid crystal-monomer mixture (150) disposed between upper and lower plastic substrates (111, 112). The cell (100) is then exposed to ultraviolet light (170) causing the monomer to be selectively polymerized to form support walls (108) between substrates (111, 112) of the cell in the light-intense areas. The monomer may be selectively polymerized by exposing the cell (100) through a mask (180, 188). The distance between the substrates (111, 112) is maintained before the walls (108) are formed by dispersing plastic ball spacers (114) between the substrates (111, 112). During exposure to the UV light, the substrates (111, 112) are sandwiched between substantially planar supports (182, 184) to maintain contact between the substrates (111, 112) and the spacers (114) and thus a uniform distance between the substrates (111, 112).

14 Claims, 2 Drawing Sheets

METHOD FOR FORMING UNIFORMLY-SPACED PLASTIC SUBSTRATE LIQUID CRYSTAL DISPLAYS

The United States Government has a paid-up license in this invention and may have the right in limited circumstances to require the patent owner to license others upon reasonable terms as provided for by the terms of Grant DMR89-20147, awarded by the National Science Foundation and Contract No. N61331-94-K-0042, awarded by the Advanced Research Projects Agency.

FIELD OF THE INVENTION

The present invention relates generally to a method for forming uniformly-spaced plastic substrate liquid crystal displays. More particularly, the present invention is directed toward a method for forming uniformly-spaced plastic substrate liquid crystal displays by dissolving a polymerizable monomer in a liquid crystal and selectively curing the monomer to form the support walls. Specifically, the monomer is selectively cured by applying a mask to a substrate and selectively polymerizing the monomer by exposing the liquid crystal-monomer mixture through the mask to ultraviolet light.

BACKGROUND OF THE INVENTION

A typical liquid crystal display cell includes a liquid crystal sealed between two glass substrates. A plurality of spacers are disposed between the substrates to maintain a constant distance between the substrates. When assembled, the internal pressure of the device may be lowered below atmospheric such that the glass substrates are forced in contact with the spacers. The glass substrates are relatively rigid in order to prevent the substrates from bending in the expanses between the spacers. The combination of the negative pressure and the rigidity of the glass substrates causes the distance between the substrates to be maintained even when external forces such as pinching and bending act on the display device.

Plastic substrates are desirable in certain liquid crystal display cells because they allow the display device to be somewhat flexible. A problem with a display device having plastic substrates is that there is often material flow between compartmentalized liquid crystal areas when the substrate is subject to external forces. Another problem with plastic substrates is that "pillowing" can occur when the plastic substrate is subject to external forces such as pinching or excessive flexing. Such phenomena disrupt the desired configuration of the display device. Liquid crystal display devices having plastic substrates also cannot maintain the cells at lower-than-atmospheric pressure because the plastic substrate material allows atmospheric gasses to diffuse or leak into the liquid crystal cells thereby negatively affecting the liquid crystals properties.

One solution to these problems is to provide a plastic substrate having a plurality of ridges on which the opposing substrate rests. The ridges provide support between the plastic substrates and act to maintain a constant distance between the substrates. An undesirable aspect of this solution is that the method of manufacturing the ridged substrate is relatively complicated. Another undesirable aspect is that filling the cell with liquid crystal is complicated by the ridges which impede the flow of the liquid crystal into the area between the substrates. Furthermore, a ridged substrate prohibits the use of compartmentalized cells because the ridges prevent these cells from being easily filled.

SUMMARY OF THE INVENTION

In view of the foregoing, an object of the present invention is to provide a method for forming uniformly-spaced plastic substrate liquid crystal displays.

Another object of the present invention is to provide a method, as above, that includes the use of polymerizable monomer units that are dissolved in the liquid crystal in the display device which is selectively polymerized by exposing the cell to ultraviolet light.

A further object of the present invention is to provide a method, as above, wherein the liquid crystal-monomer mixture is selectively cured by masking one of the substrates and exposing the device to ultraviolet light.

These and other objects of the invention, as well as the advantages thereof over existing in prior art forms, which will be apparent in view of the following detailed specification, are accomplished by means hereinafter described and claimed. In general, a method for forming a uniformly-spaced plastic substrate liquid crystal display includes the steps of providing upper and lower plastic substrates having a liquid crystal-monomer mixture disposed between the substrates to form the cell, the monomer being polymerizable; and selectively polymerizing the monomer to form support walls between the substrates.

Further, the invention is directed toward a method for forming a uniformly-spaced plastic substrate liquid crystal display including the steps of providing upper and lower substrates; forming a patterned, light-blocking mask on one of the substrates; forming a cell by placing a liquid crystal-monomer mixture between the upper and lower substrates; and exposing the cell to ultraviolet light until the monomer polymerizes in the light-intense areas to form support walls.

To acquaint persons skilled in the art most closely related to the present invention, one preferred embodiment of a method for forming a uniformly-spaced plastic substrate liquid crystal display is disclosed herein by, and with reference to the annexed drawings that form a part of the specification. The exemplary method is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention; the invention being defined by the appended claims and their equivalent embodiments.

DESCRIPTION OF AN EXEMPLARY EMBODIMENT

Figure 1:
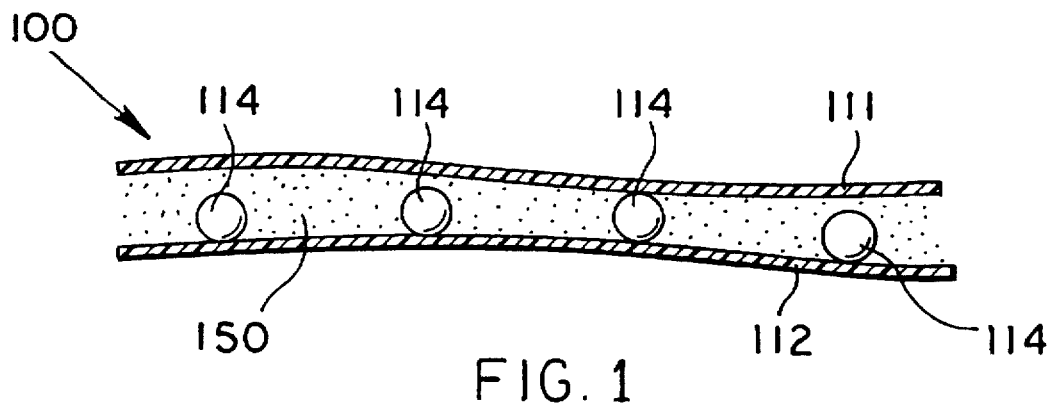
FIG. 1 is a schematic, sectional side view of a liquid crystal display cell having plastic substrates.
Figure 2:
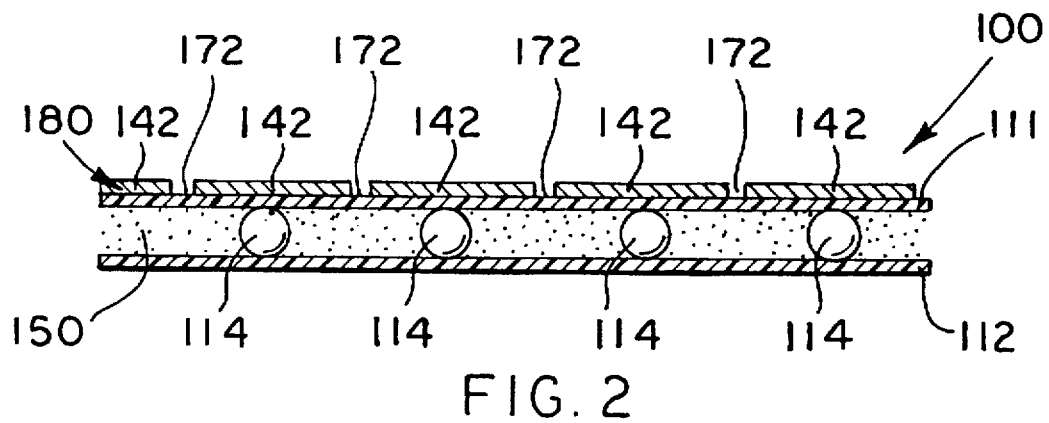
FIG. 2 is a schematic, sectional side view of a liquid crystal display cell having an external mask applied to the upper substrate.
Figure 3:
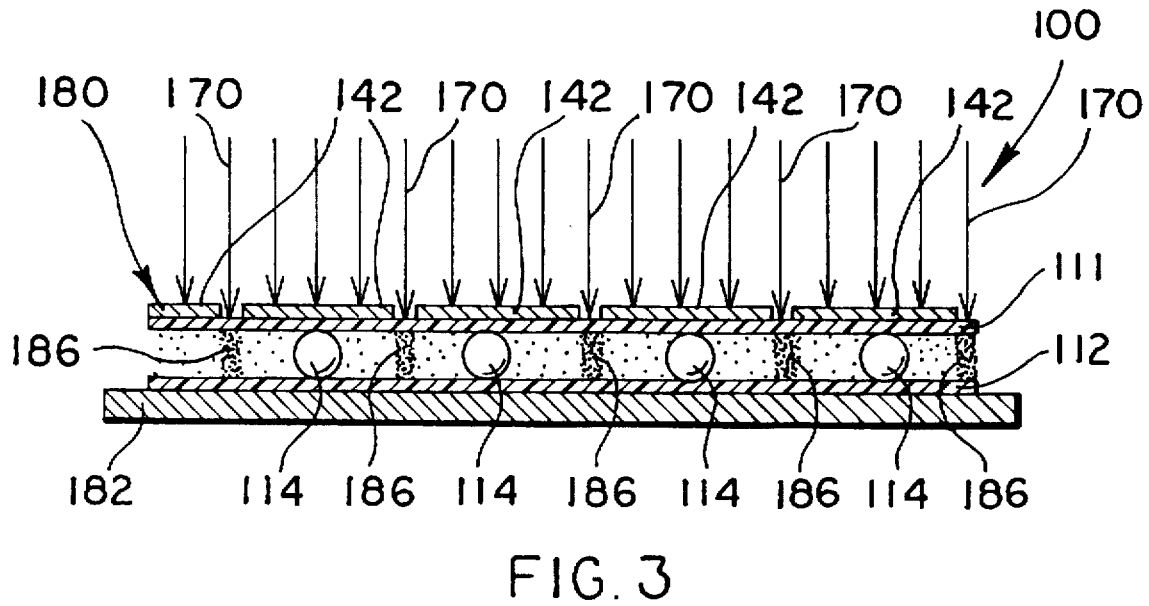
FIG. 3 is a schematic, sectional side view of a liquid crystal display cell having an external mask applied to one of the substrates and being exposed to ultraviolet light, the cell being depicted on a planar support surface.
Figure 4:
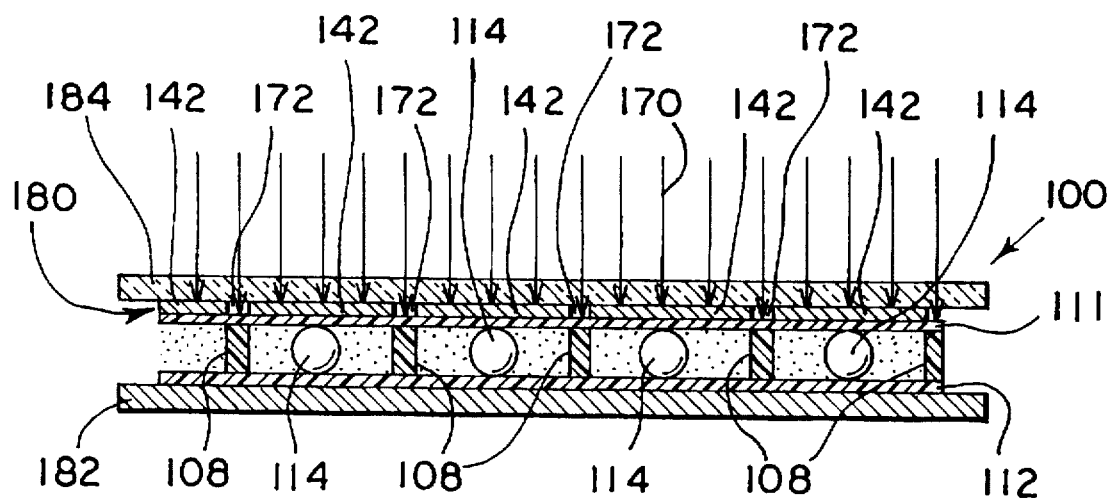
FIG. 4 is a schematic, sectional side view of a liquid crystal display cell having an external mask applied to one of the substrates and being exposed to ultraviolet light with the support walls substantially formed, the cell being depicted as being sandwiched between planar support surfaces.
Figure 5:
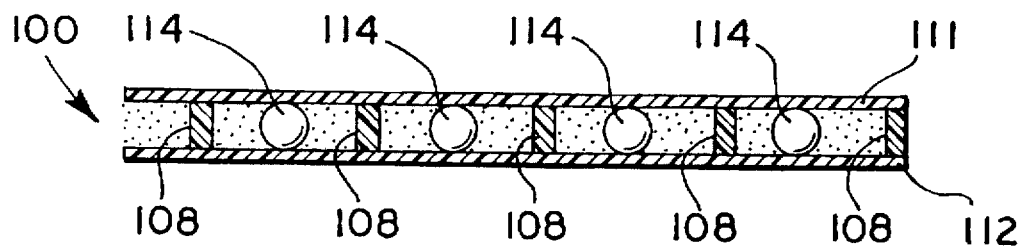
FIG. 5 is a schematic, sectional side view of a liquid crystal display cell having support walls formed by the method of the present invention between two plastic substrates.

An exemplary embodiment of the method for forming a uniformly-spaced plastic substrate liquid crystal display 100 is described herein with reference to the drawings. As may be seen in exaggerated proportions in FIG. 1, a liquid crystal cell 100 having plastic substrates 111, 112 is generally flexible and subject to bending and pinching forces. The effect of such forces may be seen in FIG. 1 where the upper substrate 111 has been forced out of contact with the ball spacers 114 that are used to help maintain a constant distance between the substrates 111, 112. It is desirable to maintain a constant distance between the substrates 111, 112. Support walls 108 maintain the distance and provide strength to the cell 100.

Figure 6:
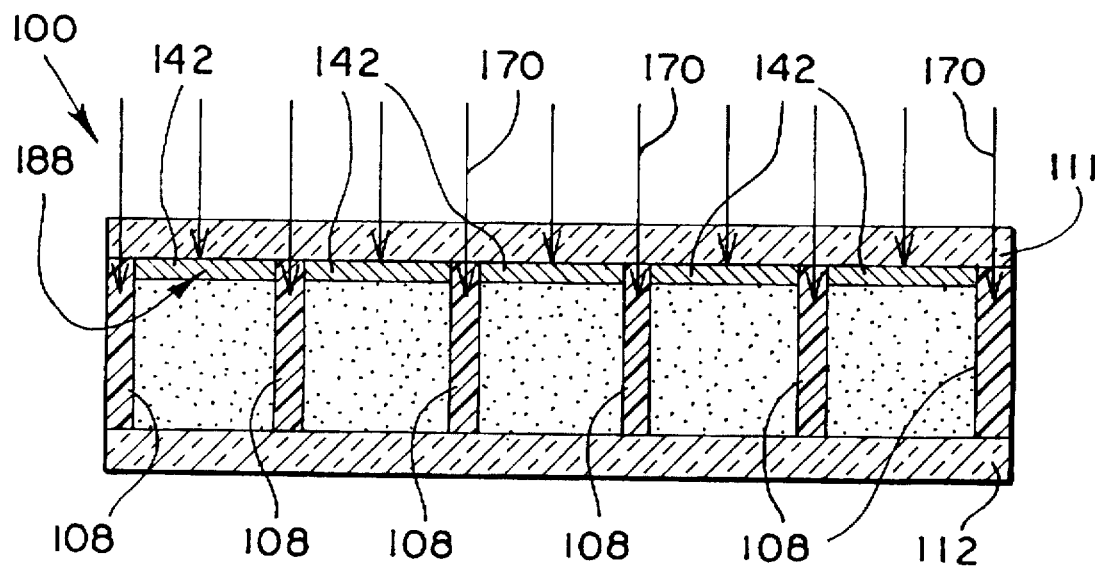
FIG. 6 is a schematic, sectional side view of a liquid crystal display cell having an internal mask applied to one of the plastic substrates and being exposed to ultraviolet light.

To form support walls 108 according to the method of the present invention, a light-blocking mask 180 is formed on one of the substrates 111, 112. In the embodiment depicted in FIGS. 1–5, the mask 180 is formed on the outer surface of the upper substrate 111. However, the mask 180 may also be formed on the lower substrate 112 if the cell is to be exposed to UV light 170 from below. FIG. 6 depicts an internal mask 188.

Mask 180 may be formed from any opaque material that may be positioned on the exterior of the cell 100 to block light. The pattern of the mask 180 determines the ultimate location of the support walls 108. The pattern is typically a grid made up of rows 142 and columns (not shown) that form a plurality of pixels (not shown) such that the pixels may be referred to by their particular row and column number. Of course, the present invention contemplates that a variety of patterns may used and the present invention is not limited to a grid pattern.

One example of a mask 180 that may be used as an external mask 180, but is also particularly useful as an internal mask 188 (see FIG. 6) is a mask formed by spin coating a thin opaque coating such as Darc 100 (Brewer Science) on the substrate 111 at 2000 rpm for 30 seconds. Solvent is then evaporated using a hot plate at approximately 95 degrees Celsius. A photoresist is then spincoated at 3500 rpm for 30 seconds. Again, solvent is removed using a hot plate at 95 degrees Celsius for 30 seconds. The substrate 111 is then exposed to UV light (7 mW/cm$^2$) for 10 seconds through a patterned mask to form the mask 180, 188 into a grid. A developer is then used for 60 seconds. The substrate 111 is then baked at 100 degrees Celsius for approximately one hour in an oven and then allowed to cool. Once cool, the photoresist is removed using a photoresist remover.

A liquid crystal-monomer mixture 150 is dispersed between the upper 111 and lower 112 substrates. A plurality of plastic ball spacers 114 may also be dispersed between the substrates 111, 112 to provide spacing before the support walls 108 are formed. One liquid crystal mixture 150 that has been found to function with the method of the present invention is made up of 21% CE2, 21% CB15 and 58% E48 combined with a UV curable monomer such as Norland 65 (NOA 65). The mixture may be approximately 10 percent to 20 percent by weight Norland 65. The mixture 150 is heated until it clears and mixes well. The mixture 150 may be one of the many that allow a dispersed monomer to polymerize when exposed to UV light 170 without negatively influencing the properties of the liquid crystal. Other mixtures 150 known in the art will also function in the method of the present invention.

The liquid-crystal monomer mixture 150 may be poured onto the lower substrate 112 and the upper substrate 111 placed on top of it. A roller may then be used to apply an even force to the substrates 111, 112. Typically, the force will be sufficient to cause the substrates 111, 112 to remain joined temporarily. Once joined, the cell 100 may be placed on a substantially planar surface 182 where it will be exposed to UV light. Other methods that apply forces to the substrates 111, 112 are also useful to maintain the relative positions of the substrates 111, 112. Another method of maintaining the positions of the substrates 111, 112 is to place the cell 100 on a substantially planar surface 182 and to place a relatively rigid structure such as a plate of glass 184 on top of the cell 100. The glass plate 184 forces the plastic substrates 111, 112 against the plastic spacer balls 114 thus fixing the distance between the substrates 111, 112 and maintaining relatively planar substrates 111, 112.

The masked cell 100 is then exposed to UV light 170. As may be seen in FIG. 3, the monomer dissolved in the liquid crystal begins to polymerize in the areas 186 where the light passes into the cell 100 and eventually forms support walls 108 as may be seen in FIG. 4. The liquid crystal is thus left in the low light intensity areas between the walls 108 that formed in the light-intense areas 172. Once the monomer is adequately polymerized, the cell 100 may be removed from the support and used. While the walls 108 are being formed, the positions of the substrates 111, 112 are maintained by the plates 182, 184. The plates 182, 184 force the substrates 111, 112 against the ball spacers 114. Thus, when the walls 108 form, the substrates 111, 112 have been fixed at a uniform distance.

As may be seen in FIG. 6, an internal mask 188 may also be used. The internal mask 188 may be formed by spin coating a coating onto a substrate 111, 112 and baking the coating onto the substrate 111, 112. The areas where the light is intended to pass through the mask 188 are then removed by appropriate means such as photolithography. Once the mask 188 is complete, the cell 100 is assembled and filled with the liquid crystal-monomer mixture 150. The internally masked cell 100 is then exposed to UV light and support walls 108 form in those areas 172 where the mixture 150 is exposed to the UV light 170. Of course, a cell 100 with an internal mask 188 may only be viewed through the substrate 112 that does not carry the mask 188.

While only a preferred embodiment of the present invention is disclosed, it is to be clearly understood that the same is susceptible to numerous modifications apparent to one skilled in the art. For instance, the descriptions of the liquid crystals and the monomers are for exemplary purposes only and it is contemplated that other substances known to those skilled in the art may be substituted for the examples shown. The same may also be said for the exemplary temperatures and times described. Furthermore, the specific method of forming the support walls is merely a preferred embodiment and other methods for selectively polymerizing the monomer to form the walls that are known to those skilled in the art may also be used in accordance with the concepts of the present invention. Therefore, the scope of the present invention is not to be limited to the details shown and described but is intended to include all changes and modifications which come within the scope of the appended claims and their equivalents.

What is claimed is:

1. A method for forming a uniformly-spaced plastic substrate liquid crystal display, comprising the steps of:

providing upper and lower plastic substrates;

disposing a liquid crystal-monomer mixture, which has a plurality of uniformly-sized spacers disposed therein, between the substrates to form the cell; and selectively polymerizing the monomer to form support walls between the substrates by applying a light-blocking mask on one of the substrates and exposing the cell to ultraviolet light, wherein said plurality of uniformly-sized spacers maintain a uniform distance between said susbstrates.

2. The method according to claim 1, wherein the step of applying the light-blocking mask includes the step of applying the light-blocking mask to the external surface of one of the substrates.

3. The method according to claim 1, wherein the step of applying the light-blocking mask includes the step of applying the light-blocking mask to the internal surface of one of the substrates.

4. The method according to claim 1, wherein the step of disposing includes the step of dispersing plastic ball spacers in the mixture.

5. The method according to claim 4, further comprising the step of supporting the plastic substrates on a substantially planar surface before selectively forming the support walls.

6. The method according to claim 5, further comprising the step of placing a transparent, substantially planar element on top of the cell to trap the substrates between the element and the surface and to force the substrates against the ball spacers.

7. A method for forming a uniformly-spaced plastic substrate liquid crystal display, comprising the steps of:

providing upper and lower plastic substrates;

forming a patterned, light-blocking mask on one of the substrates, the light-blocking mask forming a pattern of light-intense areas;

forming a cell by placing a liquid crystal-monomer mixture, which has a plurality of uniformly-sized spacers dispersed therein between the upper and lower substrates; and exposing the cell to ultraviolet light until the monomer polymerizes in the pattern of light-intense areas to form support walls, wherein said plurality of uniformly-sized spacers maintain a uniform distance between said substrates.

8. A method according to claim 7, further comprising the step of positioning the substrates such that the mask contacts the liquid crystal-monomer mixture.

9. A method according to claim 7, further comprising the step of positioning the substrates such that the mask does not contact the liquid crystal-monomer mixture.

10. A method according to claim 7, further comprising the step of removing the mask after the support walls have formed.

11. A method according to claim 7, further comprising the step of dispersing the mixture with a plurality of uniformly-sized spacers onto a surface of one of the substrates facing the other substrate before the substrates are assembled into a cell.

12. A method according to claim 11, further comprising the step of supporting the plastic substrates on a substantially planar surface before forming the support walls.

13. A method according to claim 12, further comprising the step of placing a transparent, substantially planar element on top of the substrates such that the substrates are forced against the plurality of uniformly-sized spacers and a uniform distance is maintained between the substrates.

14. A method according to claim 7, further comprising the step of applying pressure to the substrates after the cell is formed.

* * * * *

UNITED STATES PATENT AND TRADEMARK OFFICE
CERTIFICATE OF CORRECTION

PATENT NO. : 5,766,694
DATED : June 16, 1998
INVENTOR(S) : JOHN L. WEST and PHILIP J. BOS It is certified that error appears in the above-indentified patent and that said Letters Patent is hereby corrected as shown below:

On the title page, insert item [73]:

--Assignee: Kent State University, Kent, Ohio --.

Signed and Sealed this

Twenty-sixth Day of January, 1999

Attest:

Attesting Officer

*Acting Commissioner of Patents and Trademarks*